Jan. 30, 1940.     J. J. TYNE     2,188,584
REAMER
Filed Sept. 22, 1938
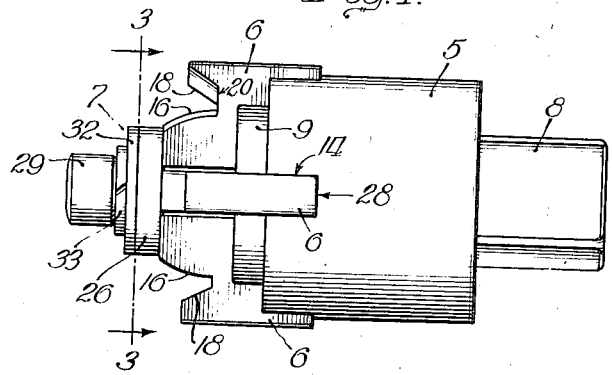
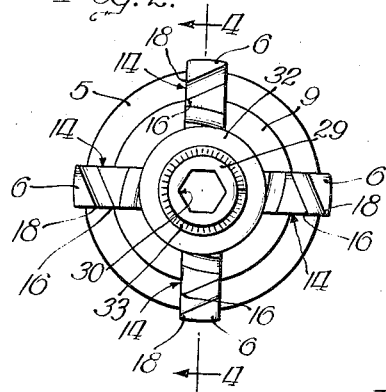
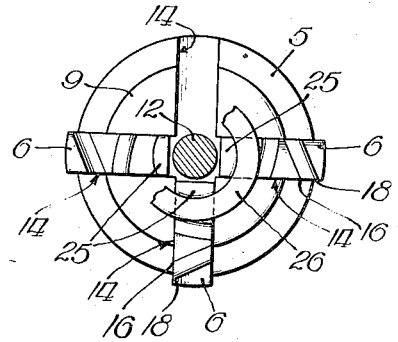
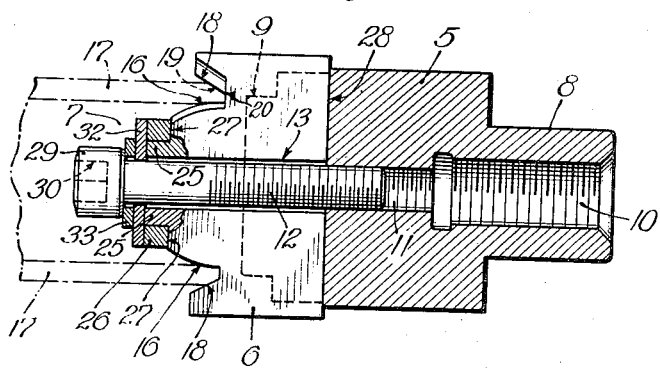
INVENTOR:-
John J. Tyne
BY
Brown, Jackson, Boettcher & Dienner
ATTORNEYS.

Patented Jan. 30, 1940

2,188,584

UNITED STATES PATENT OFFICE 2,188,584

REAMER

John J. Tyne, Oak Park, Ill., assignor to Tyne Co., Chicago, Ill., a corporation of Illinois Application September 22, 1938, Serial No. 231,213

3 Claims. (Cl. 77—73)

This invention relates to a reamer.

The particular embodiment of the invention which I shall herein illustrate and describe is a reamer for reaming and chamfering the ends of pipes, nipples, tubes and the like, and more particularly a reamer for use on the threading die heads of pipe and nipple threading machines.

While the particular device which I shall describe hereinafter in connection with the drawing is a reamer adapted for use with the "Landis" type threading die head and on the pipe and nipple threading machine of my copending application Serial No. 231,214, filed September 22, 1938, it is to be understood that it is not limited to such use but may be modified to fit any other threading die head and for use on any other threading machine, or for any similar work.

The main object of the present invention is to provide a reamer of the class mentioned above, with separately detachable reamer blades or cutters and improved means for locking same in place and, at the same time, permitting convenient removal and replacement of any one or more blades upon breakage or the like without replacing the entire reamer, which heretofore has been necessary where the blades have been formed as an integral part of the reamer body.

Further objects and advantages of the invention will appear from the following detailed description, taken in connection with the accompanying drawing in which:

Figure 1 is a side elevational view of a reamer embodying the present invention;

Figure 2 is an end view of the same looking from the left hand end as viewed in Figure 1;

Figure 3 is a sectional view taken along the line 3—3 of Figure 1, showing the locking collar partially broken away and one of the blades or cutters removed; and Figure 4 is a longitudinal section taken substantially on the line 4—4 of Figure 2.

Referring now in detail to the drawing, the embodiment of the invention selected for illustration comprises the main reamer body 5, a plurality of separately detachable blades or cutters 6—four of said blades or cutters 6 being shown in the drawing—and locking means 7 for locking the blades 6 in place and at the same time permitting convenient removal and replacement of any one or more blades on breakage or the like without replacing the entire reamer or blades which are not broken or otherwise do not require replacement.

The reamer body 5 is of generally cylindrical form and has a square or other polygonal or non-circular shank 8 for locking or drivingly connecting the reamer body to the driving spindle of the threading die head for rotation therewith, as well understood in the art. The forward end of the body member 5 has a concentric cylindrical extension of reduced diameter, as indicated at 9. An internally threaded opening 10 extends axially through the shank 8 and is adapted for threaded engagement with a reamer adjusting tube (not shown) for adjusting the position at which the threading die head is tripped to open the threading jaws and thereby the length of thread formed on the pipe, nipple, tube, or the like.

The forward end of the threaded opening 10 opens into an internally threaded axial opening 11 of reduced diameter. This internally threaded opening 11 is adapted for threaded engagement with the locking bolt 12 and, at its forward end, opens into the space between the inner edges 13 of the blades 6, the shank of the bolt 12 passing freely through this space. The space between the inner edges 13 of the blades opens axially from the forward end of the reamer body member 5.

Also opening from the forward end or front face of the reamer body member 5 and extending into the main body of the member 5 are a plurality of radial grooves 14, one for each of the blades 6, and spaced equidistant circumferentially about the forward end of the body member 5. One blade 6 fits relatively firmly or tightly in each groove 14, and at the same time is adapted for convenient removal therefrom. With four blades 6 as shown in the drawing, the grooves 14 quadrate the forward end of the body member 5, and the grooves are arranged in pairs with the two grooves of each pair diametrically opposite and with one pair of grooves substantially normal or at substantially right angles to the other pair.

Each separately removable blade 6 has a cutting edge 16, for reaming or taking the burr off the inside of the end of the pipe or tube shown in dotted lines at 17 (Figure 4), and a cutting edge 18, for chamfering the outside of the end of the pipe or tube 17 as shown at 19. Shoulders 20, between each pair of cutting edges 16 and 18, are adapted to be engaged by the end of the pipe or tube when the proper length of thread is formed and the end of the pipe or tube has been reamed and chamfered, as above set forth. This engagement of the end of the pipe or tube 17 with the shoulders at 20 actuates the tripping mechanism, which trips the threading die head and thereby opens the threading jaws.

The forward end of each blade 6 has an integral lug 25 extending forwardly from the inner edge of the blade. With all of the blades in place in the respective grooves 14, a locking collar or ring 26 is placed in encircling relation over the lugs 25 as shown in Figure 4, to hold the forward ends of the blades firmly in operative position. The ring or collar 26 seats upon shoulders 27 at the forward ends of the cutting edges 16, and the rear ends of the blades 6, which are substantially normal to the outer and inner edges of the blades, seat at 28 against the walls defining the inner ends of the grooves 14. The outer surfaces of the lugs 25 are rounded, as shown in Figure 3, to conform with the curvature of the opening in the locking collar 26.

The locking bolt 12 extends axially and loosely between the inner edges 13 of the blades 6, and has threaded engagement with the threaded opening at 11. The head 29 of the bolt 12 is shown provided with a polygonal recess 30 which is adapted to be engaged by a suitable tool for threading the bolt into place and removing it from the body of the reamer. A disc 32 and split spring washer 33 are preferably interposed between the head of the bolt and the outer ends of the lugs 25 and locking collar 26. When the bolt 12 is tightened into place it clamps the blades endwise into firm seating engagement with the body member 5 at 28, and, at the same time, the locking collar 26 is firmly locked in place and, by encircling the lugs 25, holds the blades firmly in operative position.

If, for example, one blade is broken or, for other reason, it is desired to replace one blade, all that is necessary is to remove the bolt 12, the disc 32, spring washer 33, and the blade to be replaced, whereupon another blade is substituted and the locking collar 26, disc 32, spring washer 33, and bolt 12 are applied to lock all blades again securely in position. Any other number of blades may, of course, be replaced in like manner without replacing the entire reamer.

I do not intend to be limited to the precise details shown or described.

I claim:

1. A pipe end reamer and chamfering tool comprising, in combination, a body member having a plurality of grooves opening laterally and from the outer end thereof, a plurality of separately replaceable pipe end reaming and chamfering blades mounted in said grooves, each of said blades having at its outer end and spaced longitudinally from the end of the body member a recess forming an externally directed cutting edge for reaming the inside of the end of a pipe and an internally directed cutting edge positioned radially outwardly of said external cutting edge and adapted for chamfering the outside of the end of the pipe, lugs integral with said blades and extending forwardly from the ends of the blades and disposed inwardly of the reaming portions of said outwardly directed inner cutting edges, a locking ring encircling said lugs and disposed inwardly of the reaming portions of said outwardly directed inner cutting edges to permit a pipe end to pass thereover, a locking bolt having a head and a threaded shank extending axially and relatively loosely between the inner edges of said blades and threaded into said body member, and a washer interposed between the head of said bolt and the adjacent ends of said blades and cooperating with the lugs on said blades for clamping the blade in place in said grooves, said washer also cooperating with said locking ring to hold same in place.

2. A pipe end reamer and chamfering tool comprising, in combination, a body member having a plurality of grooves opening laterally and from the outer end thereof, a plurality of separately replaceable pipe end reaming and chamfering blades mounted in said grooves, each of said blades seating at its inner end against said body member at the inner ends of said grooves and having at its outer end and spaced longitudinally from the end of the body member a recess forming an externally directed cutting edge for reaming the inside of the end of a pipe and an internally directed cutting edge positioned radially outwardly of said external cutting edge and adapted for chamfering the outside of the end of the pipe, said blades having inwardly directed shoulders at the outer ends of said externally directed inner cutting edges, lugs integral with said blades and extending from the inner ends of said shoulders, a locking ring encircling said lugs and disposed inwardly of the reaming portions of said outwardly directed inner cutting edges to permit a pipe end to pass thereover, a locking bolt having a head and a threaded shank extending axially and relatively loosely between the inner edges of said blades and threaded into said body member, and a washer interposed between the head of said bolt and the adjacent ends of said blades and cooperating with the lugs on said blades for clamping the blades endwise into firm seating engagement with the body member at the inner ends of said grooves, said washer also cooperating with said locking ring to hold same in place.

3. A pipe end reamer and chamfering tool comprising, in combination, a body member having a plurality of grooves opening laterally and from the outer end thereof, a plurality of separately replaceable pipe end reaming and chamfering blades mounted in said grooves, each of said blades seating at its inner end against said body member at the inner ends of said grooves and having at its outer end and spaced longitudinally from the end of the body member a recess forming an externally directed cutting edge for reaming the inside of the end of a pipe and an internally directed cutting edge positioned radially outwardly of said external cutting edge and adapted for chamfering the outside of the end of the pipe, said blades having radially directed shoulders between the inner ends of said cutting edges, lugs integral with said blades and extending forwardly from the ends of the blades inwardly of the reaming portions of said outwardly directed inner cutting edges, a locking ring encircling said lugs and disposed inwardly of the reaming portions of said outwardly directed inner cutting edges to permit a pipe end to pass thereover, a locking bolt having a head and a threaded shank extending axially and relatively loosely between the inner ends of said blades and threaded into said body member, a washer interposed between the head of said bolt and the adjacent ends of said blades and cooperating with the lugs on said blades for clamping the blades in place on said grooves, said washer also cooperating with said locking ring to hold same in place, and a spring washer interposed between the head of the bolt and said first washer.

JOHN J. TYNE.